(12) United States Patent
Zuloff

(10) Patent No.: US 9,039,184 B2
(45) Date of Patent: May 26, 2015

(54) COMPACT THREE-DIMENSIONAL VIRTUAL DISPLAY SYSTEM

(76) Inventor: Steve Zuloff, Chatsworth, CA (US)

( * ) Notice: Subject to any disclaimer, the term of this patent is extended or adjusted under 35 U.S.C. 154(b) by 311 days.

(21) Appl. No.: 13/072,535

(22) Filed: Mar. 25, 2011

(65) Prior Publication Data

US 2012/0242958 A1    Sep. 27, 2012

(51) Int. Cl.
G02B 27/22    (2006.01)
G02B 27/02    (2006.01)
G09F 13/20    (2006.01)
H04N 13/04    (2006.01)

(52) U.S. Cl.
CPC .......... *G02B 27/025* (2013.01); *H04N 13/0402* (2013.01); *G02B 27/2292* (2013.01); *G02B 27/2221* (2013.01); *G09F 13/20* (2013.01)

(58) Field of Classification Search
CPC ........................ G02B 27/2292; H04N 13/0402
USPC .................................. 353/10, 28, 77
See application file for complete search history.

(56) References Cited

U.S. PATENT DOCUMENTS

| | | | |
|---|---|---|---|
| 3,293,983 A | 12/1966 | Gaudyn | |
| 3,298,277 A | 1/1967 | Scharf | |
| 3,666,936 A | 5/1972 | Webster, Jr. et al. | |
| 3,868,501 A | 2/1975 | Barbour | |
| 4,261,657 A * | 4/1981 | Reiback | 353/10 |
| 4,571,041 A | 2/1986 | Gaudyn | |
| 4,704,004 A | 11/1987 | Nosker | |
| 4,858,079 A | 8/1989 | Ohashi | |
| 5,257,130 A | 10/1993 | Monroe | |
| 5,311,357 A * | 5/1994 | Summer et al. | 359/479 |
| 5,782,547 A | 7/1998 | Machtig et al. | |
| 5,787,618 A | 8/1998 | Mullis | |
| 5,803,564 A | 9/1998 | Bruinsma et al. | |
| 5,993,005 A | 11/1999 | Geranio | |
| 6,012,815 A | 1/2000 | Bruinsma et al. | |
| 6,055,100 A | 4/2000 | Kirk | |
| 6,135,599 A | 10/2000 | Fang | |
| 6,296,375 B1 | 10/2001 | Sung et al. | |
| 6,318,868 B1 * | 11/2001 | Larussa | 359/857 |
| 6,364,490 B1 | 4/2002 | Krause | |
| 6,375,326 B2 | 4/2002 | Myers | |
| 6,497,484 B1 * | 12/2002 | Hoerner et al. | 353/10 |
| 6,568,818 B2 * | 5/2003 | Holden et al. | 359/859 |
| 6,594,083 B1 | 7/2003 | Raber | |
| 6,612,725 B2 | 9/2003 | Camarota et al. | |
| 6,809,891 B1 | 10/2004 | Kerr et al. | |
| 7,016,116 B2 | 3/2006 | Dolgoff | |
| 7,229,176 B2 | 6/2007 | Onaga | |

(Continued)

*Primary Examiner* — Sultan Chowdhury
*Assistant Examiner* — Bao-Luan Le
(74) *Attorney, Agent, or Firm* — Howard C. Miskin, Esq.; Gloria Tsui-Yip, Esq.

(57) ABSTRACT

A 3-D virtual display system that provides a compact display device which utilizes a small object to be projected. The 3-D virtual display system has a housing with a front panel having an opening, first and second opposing side panels, a display object, a mirror disposed diagonally within said housing facing said display object, a rotating motor, the display object is attached to the rotating motor adjacent to the front panel and the first side panel, a Fresnel lens covering the opening of the front panel and a light source disposed within the housing for illuminating the display object. The display object is illuminated by the light source and projects via the mirror and the Fresnel lens a virtual three-dimensional image outside the housing. The display system can provide an audio component that may be recordable by the user. The display system is capable of accepting a removable advertising faceplate.

22 Claims, 7 Drawing Sheets

(56) References Cited

U.S. PATENT DOCUMENTS

| | | |
|---|---|---|
| 7,562,983 B2 | 7/2009 | Kim et al. |
| 7,614,749 B2 * | 11/2009 | Vrachan et al. ................. 353/10 |
| 7,621,640 B2 | 11/2009 | Lloyd |
| 8,033,229 B1 * | 10/2011 | McCanna ..................... 108/145 |
| 2005/0195368 A1 | 9/2005 | Bissinger |
| 2007/0195056 A1 * | 8/2007 | Lloyd ........................... 345/102 |
| 2007/0229952 A1 | 10/2007 | Takayoshi |
| 2007/0247794 A1 * | 10/2007 | Jaffe et al. ..................... 361/681 |
| 2007/0297073 A1 | 12/2007 | Braithwaite et al. |
| 2008/0049189 A1 * | 2/2008 | Vrachan et al. ................. 353/10 |
| 2011/0222028 A1 * | 9/2011 | Hsieh et al. .................... 353/101 |

\* cited by examiner

COMPACT THREE-DIMENSIONAL VIRTUAL DISPLAY SYSTEM

FIELD OF THE INVENTION

The invention relates to a three-dimensional ("3-D") virtual display system that is compact, easily viewable and has entertaining and advertising values. The 3-D virtual display system projects a 3-D virtual image of an object with accompanying audio and faceplate to provide entertainment and/or advertising values.

BACKGROUND

3-D virtual display systems have been available for years. A typical prior art 3-D virtual display system includes a housing having an optical lens at an opening of the housing. Located within the housing are an object and a light source. The light source illuminates the object and projects through the optical lens in a straight line a virtual image of the object floating in mid-air outside the housing. In order to properly project the virtual image in front of the lens, the object must be at a certain distance behind the lens. As a result, prior art virtual display devices typically have a bulky and large housing. Due to optical limitations, in order to view the virtual image, a person is required to be located within a narrowly confined viewing area in order to properly view the virtual image. A person located outside of this viewing area will not be able to view the virtual image at all or will see a skewed virtual image.

This type of prior art device is usually an arcade style or a table-top unit. In such prior art constructions the object is fixed in the housing and the size of the object to be projected by the lens to create a viewable virtual image is quite substantial. The object to be displayed is typically mounted on the base at the back of the device thereby limiting the size of the device, the size of the object, and the size of the projection.

A prior art virtual display device sought to overcome the bulky housing by using a mirror to provide the optical distance to properly project the virtual image is known. See U.S. Pat. No. 4,261,657.

None of the known prior art devices provide for accompanying audio with the 3-D virtual display. Still further, none of the prior art devices provide for a removable faceplate where advertising indicia can be displayed.

Therefore there is a need for a 3-D virtual display device that is compact, allows for a small object to be projected which can be easily changed, is capable of producing a large virtual image, provides audio and accepts an advertising faceplate.

SUMMARY OF THE INVENTION

The improved 3-D virtual display system of the present invention provides a compact display device which utilizes a small object to be projected. The present invention also allows the user of the display system to easily inter-change the display object from the side of the display device. Further, the display system provides an audio component. Still further the display system is capable of accepting an advertising faceplate to be used as a point-of-sale advertising.

The present invention is a 3-D virtual display system that projects a virtual image of a display object. The 3-D virtual display system has a housing. Within the housing are: a display object, a motor connected to a rod that supports and rotates the object, a plurality of LEDs for illuminating the object at different angles, a mirror, a speaker and a power supply. The housing has a front panel which is capable of accepting a removable faceplate thereon.

BRIEF DESCRIPTION OF THE DRAWINGS

Preferred embodiments of the present invention have been chosen for purposes of illustration and description and are shown in the accompanying drawings forming a part of the specification wherein.

DETAILED DESCRIPTION OF THE PREFERRED EMBODIMENTS

Figure 5:
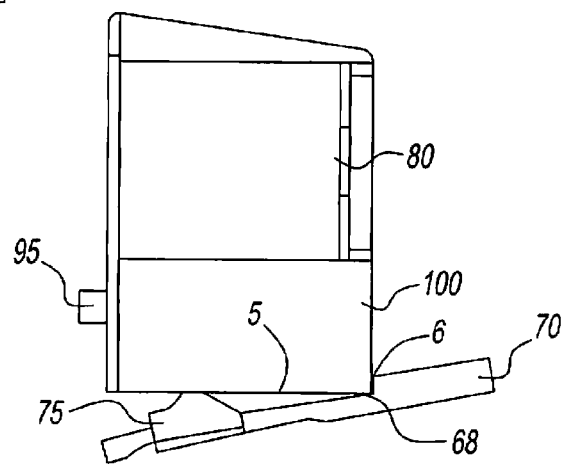
FIG. 5 is a right side view of FIG. 1.
Figure 6:
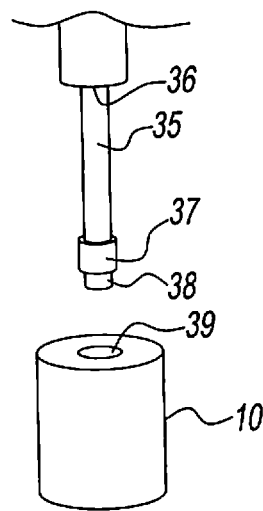
FIG. 6 is perspective view of the rod and object of the present invention of FIG. 2.
Figure 7:
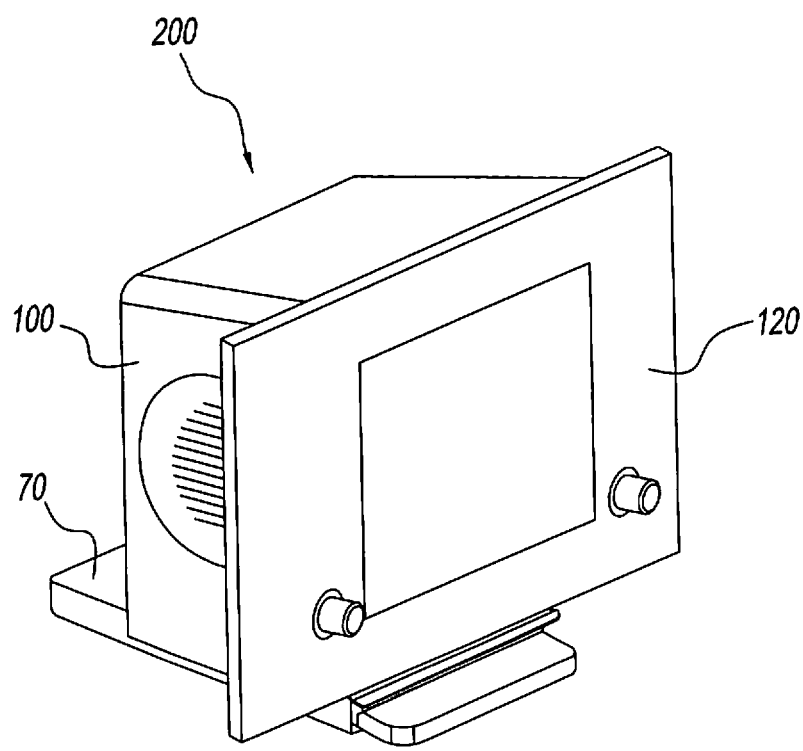
FIG. 7 is a perspective view of the 3-D virtual display system of the present invention with the faceplate attached.
Figure 8:
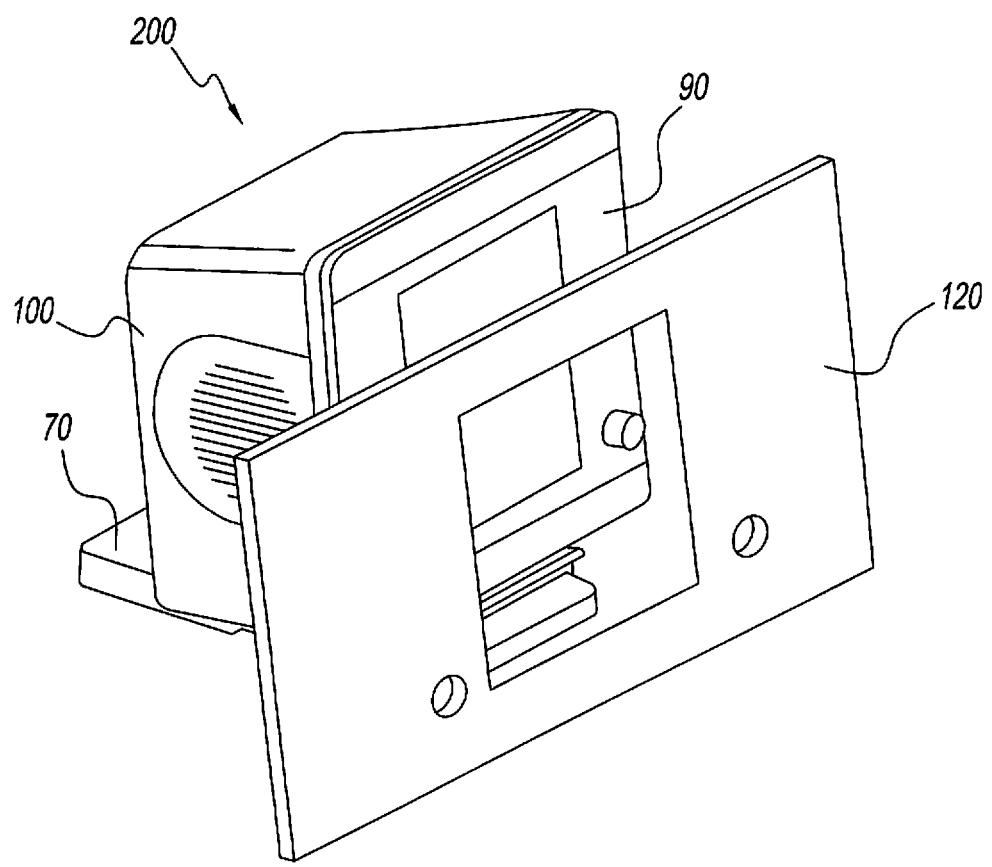
FIG. 8 is an exploded view of the faceplate of FIG. 7.

With reference to the drawings, wherein the same reference number indicates the same element throughout, FIGS. 1 through 8 show a 3-D virtual display system 200 of the present invention. The virtual display system 200 comprises a housing 100 with front panel 90 which encloses a display object 10, a Fresnel lens 20, a gear box 30, a rod 35, a mirror 40, a speaker 50, and a light source 60. The virtual display system 200 further comprises a removable faceplate 120 as shown in FIGS. 7 and 8.

Figure 1:
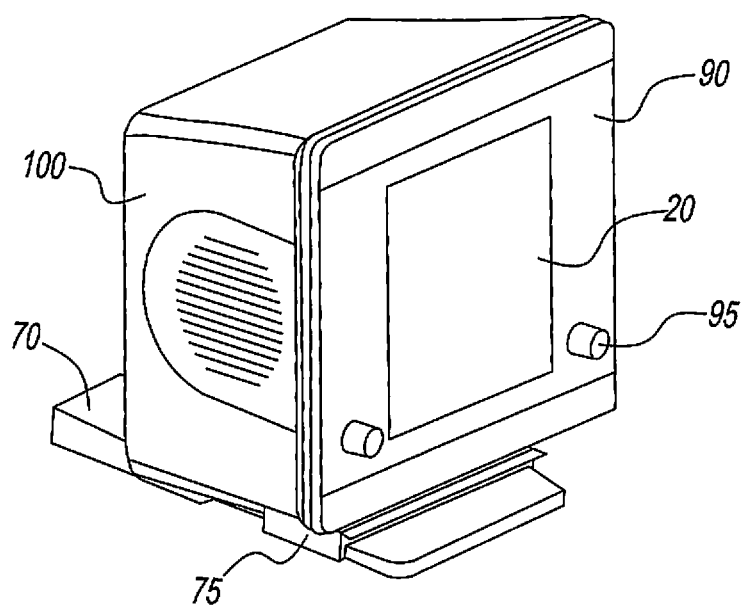
FIG. 1 is a perspective view of the 3-D virtual display system of the present invention.
Figure 2:
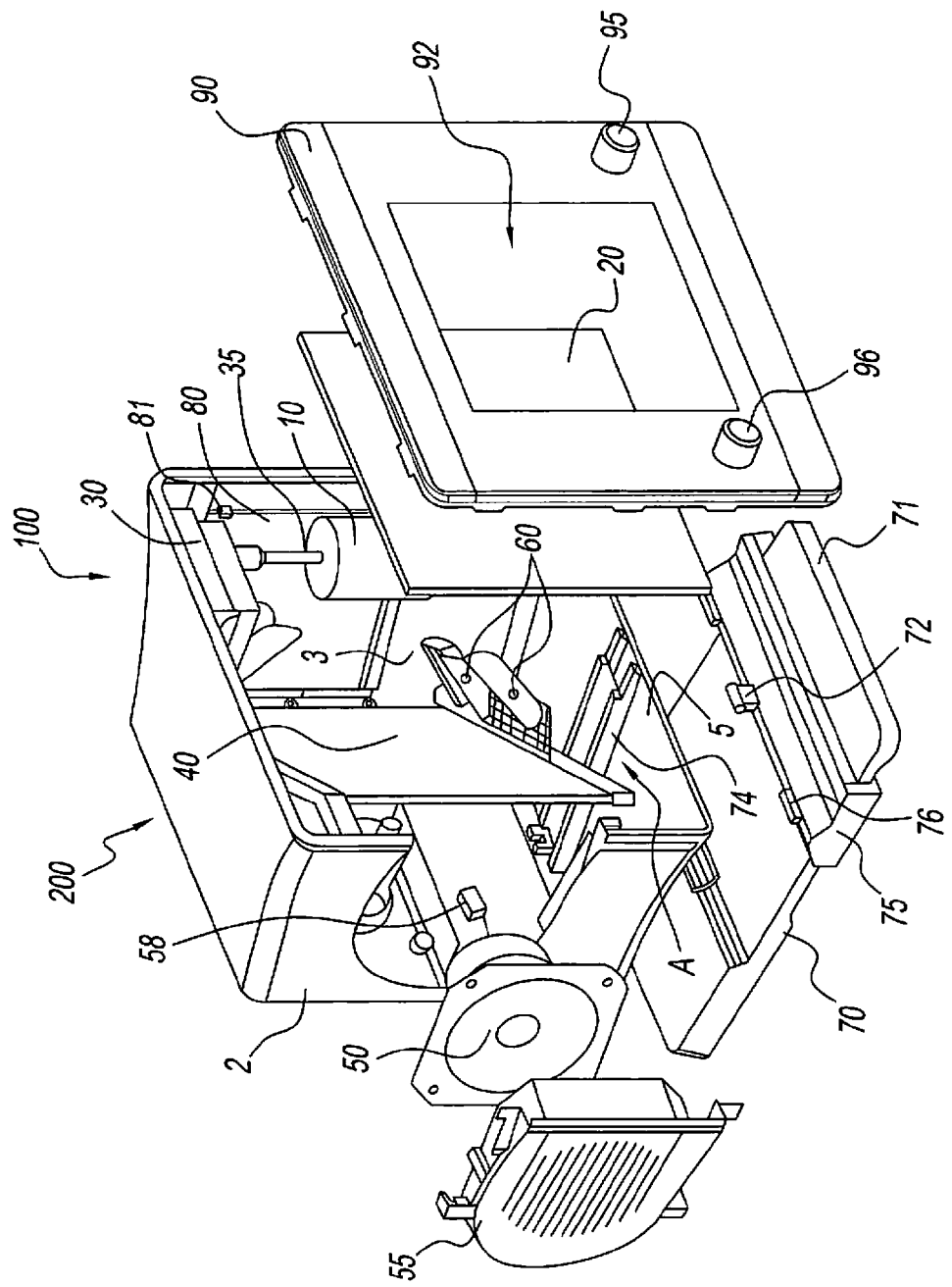
FIG. 2 is an exploded view of FIG. 1.
Figure 3:
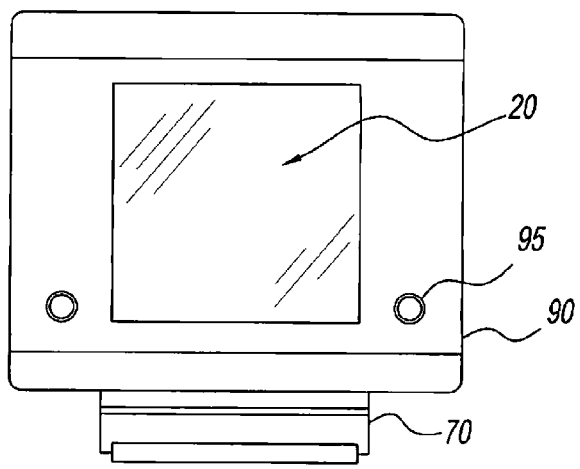
FIG. 3 is a front view of FIG. 1.

As shown in FIG. 2, the front of the housing 100 has a front panel 90, top panel 1, left side panel 2, right side panel 3, back panel 4 and bottom panel 5 which enclose an area A. The front panel 90 has two knobs 95 on its front side, which may control the power to the light source 60, gear box 30 and the speaker 50, the volume of the speaker 50, the brightness of the light source 60 and/or the speed of the gear box 30. It is contemplated that one knob 95 or a plurality of knobs 95 may be used for these various control. It is further contemplated that one of the knobs 95 is replaced with a motion and proximity infrared sensor that may control the power to the light source 60, gear box 30, the speaker 50, etc. Therefore, when a user or customer approached the housing the motion and proximity sensor will power on the unit. The front panel 90 has a central opening 92 that accepts a Fresnel lens 20. Fresnel lens 20 may be snapped onto the back of the front panel 90. The front panel 90 is connected to the housing 100. The front panel 90 is capable of accepting a removable advertising faceplate 120. In one embodiment of the present invention the faceplate 120 is attached to the front panel 90 by a snap fit. It is also contemplated that the faceplate 120 be removably connected by other means known in the art such as Velcro®, snaps, hooks, etc. The faceplate 120 may be removed and replaced with an alternate faceplate 120. It is an object of the present invention for the faceplate 120 to contain advertising indicia such as a company's colors, trademark, logo and the like. In the preferred embodiment of the invention the advertising shown on the faceplate 120 will correspond with the object 10 displayed in the 3-D virtual display system 200. For example, if the faceplate 120 advertises a soft drink company thereon, the object 10 may be a bottle of the soft drink advertised.

A gear box 30 having a motor is affixed to the inside front corner of the top panel of the housing 100 adjacent the front panel 90 and the right side panel 3. The gear box 30 has a rod 35 extends downward from it. The rod 35 has a first end 36 and a second end 37. The first end 36 of rod 35 attaches to the gear box 30 so that the rotating motor causes rod 35 to spin or rotate. The second distal end 37 of the rod 35 has a first magnet 38. The first magnet 38 allows the object 10 to be secured to the second end 37 of rod 35 by affixing a corresponding magnetizable material 39 to the bottom of object 10, as shown in FIG. 6. In an alternative embodiment, rod 35 may be fixedly attached to object 10 with the distal end of the rod 35 having a magnetizable material for magnitized connection with a magnet located at the gear box 30. It is contemplated that a motor directly connected to a rod 35 may be used in place of the gear box 30. The object 10 should be connected to the rod 35 in an upside down fashion, which purpose will be described further herein. The placement of the gear box 30 and thus the object 10, is vital to the virtual image produced as to maximize the distance between the object 10 and the mirror 40. In an alternate embodiment of the present invention a magnification mirror is used to further enlarge the size of the virtual image produced.

The housing 100 contains a mirror 40 which is disposed diagonally within the housing 100 spanning from the left front corner to the right back corner and from the top panel 1 to the bottom panel 5. The front reflective side of the mirror 40 is faced towards the front panel 90 of the housing. The housing 100 further contains a light source 60. The light source 60 is affixed to the front side of mirror 40 and is directed in such a way to illuminate object 10.

Figure 4:
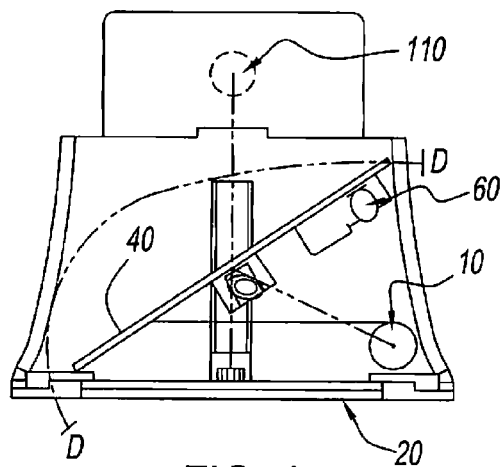
FIG. 4 is top view of FIG. 1, with partial cutout views of the housing along Line D-D.

In the preferred embodiment of the present invention the light source 60 comprises one or more LEDs or light-emitting diodes. LEDs have many advantages as they have lower energy consumption, longer lifetime, are smaller than traditional bulbs and have great reliability. In another embodiment of the present invention a black light or ultra violet LEDs are used along with an object 10 with black light responsive (e.g. fluorescent or phosphorescent) paint thereon to create an unusual and eye-catching virtual image. When the object 10 is illuminated, the Fresnel lens 20 creates a virtual image. The mirror 40 is positioned at an angle between the Fresnel lens 20 and the point where the virtual image 110 would be formed if not for the mirror 40 as shown in FIG. 4. The image of the object 10 is reflected in the mirror 40 such that the reflected image is projected through the lens to produce the virtual image outside the front panel of the housing 100. Without the use of the mirror 40 and the Fresnel lens 20 the size of the housing 100 would have to be much larger to account for the focal length of the Fresnel lens.

The virtual image created is inverted, thus is the purpose of attaching the object 10 to the rod 35 in an inverted fashion to create a virtual image with a correct upright orientation. As the gearbox 30 causes the object 10 to rotate, the virtual image projected will also be rotating. This serves to enhance the floating virtual object created and cause users or consumers to be interested in the virtual image created.

The positioning of the object 10, light source 60, mirror 40 and Fresnel lens 20 allow for the projection of the image using a small object 10 and a small housing 100. The Fresnel lens 20 and the light source 60 allow for the virtual image created to be bright as the brightness is dependent on the intensity of the light reflected off the object 10 and the focal length of the Fresnel lens 20. As used in the device, the Fresnel lens 20 is large and has a short focal length aiding in the brightness of the virtual image. It is contemplated that the a smaller object 10 may be used with a Fresnel lens 20 having a different focal length. However, it creates a smaller viewing area for the user.

The right side panel 3 of the housing 100 comprises a door 80. Door 80 has a first side 81 and a second side 82 and is connected to the right side panel 3 of the housing 100 with two hinges 83 on its first side 81 and allows a user access to the area A inside the housing 100. This enables users to remove object 10 from rod 35 and replace it with an alternate object 10.

The left side panel 2 of the housing 100 has an opening that is capable of accepting a speaker cover 55. Speaker cover 55 may be snapped into the left side panel 2 of the housing 10. Behind the speaker cover 55 inside housing 100 is speaker 50 located behind mirror 40. Speaker 50 is capable of producing sound that is stored on a sound chip 58 and may be controlled by knob 96. It is contemplated that the sound chip 58 contains music, a jingle or other audio matter that is related to the object 10 and/or the item being advertised on the faceplate 120. It is further contemplated that the speaker 50 contains a recordable sound chip which would enable a user to record and playback their personalized message. The left side panel 2 may contain an additional slide switch 140 containing a position for record, play and stop to control the recordable sound chip. A user could record their own personalized message via a microphone which could include their own voice and/or music. A user could also record a sound or song from their external audio player by connecting the external audio player to the speaker input 138 and sliding the switch 140 to the record position.

In another embodiment of the present invention the mirror 40 used is marked with indicia relating to the advertisement the device is used for. These indicia are then projected alongside the virtual image to create an even better virtual appearance.

Preferably power to the gear box 30, light source 60 and speaker 50 are supplied from a standard wall outlet with a plug. In another embodiment of the present invention the device may operate with batteries.

Figure 11:
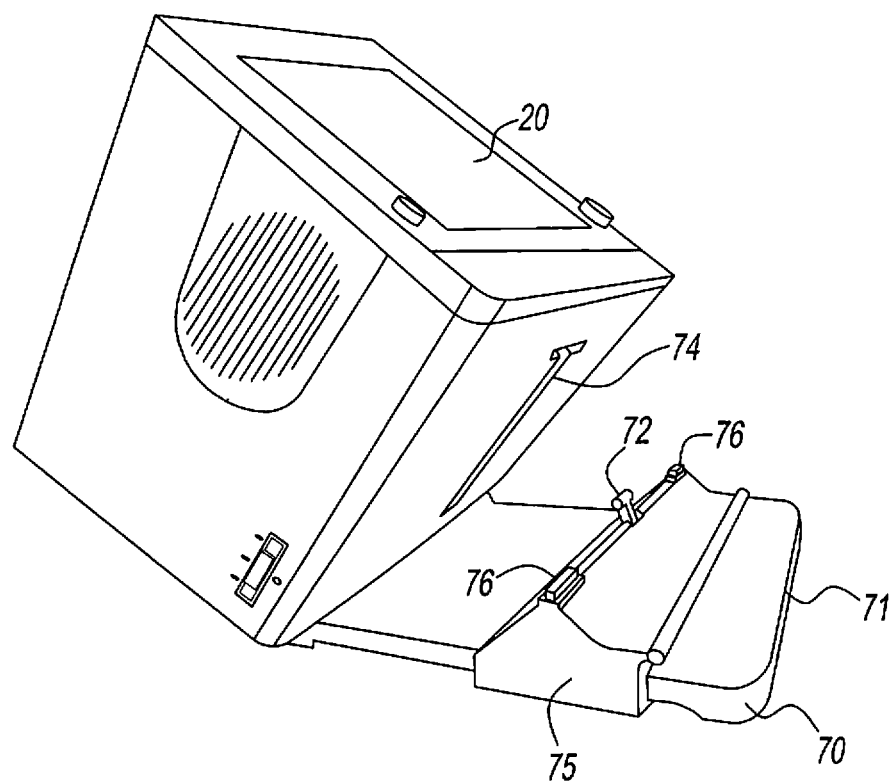
FIG. 11 is a perspective view of the 3-D virtual display system of FIG. 1 with the housing disconnected from the base.

As shown in FIGS. 2, 5 and 11, the rear edge 6 of the bottom panel 5 of the housing 100 rests against a base 70 at pivot point 68 and may be pivotable at the pivot point 68. The bottom panel 5 of the housing 100 further comprises a central track 74 running from near the front panel 90 to near the back panel 4. Base 70 has an adjustment device 75 that allows the tilting of the housing 100 to various angles to accommodate and optimize the viewing area for a user. The adjustment device 75 is slidably sleeved over base 70. The adjustment device 75 comprises an extension tab 72. The extension tab 72 fits into and slidable engages the track 74 of the housing 100. When a user wishes to adjust the viewing angle of the virtual display system 200, the adjustment device 75 is slid forward or backward along the base 70 thereby tilting the viewing angle of the housing 100 as it pivots along the pivot point 68 of the base 70. The adjustment device 75 further comprises pads 76 to safely supports the housing 100 thereon.

Figure 9:
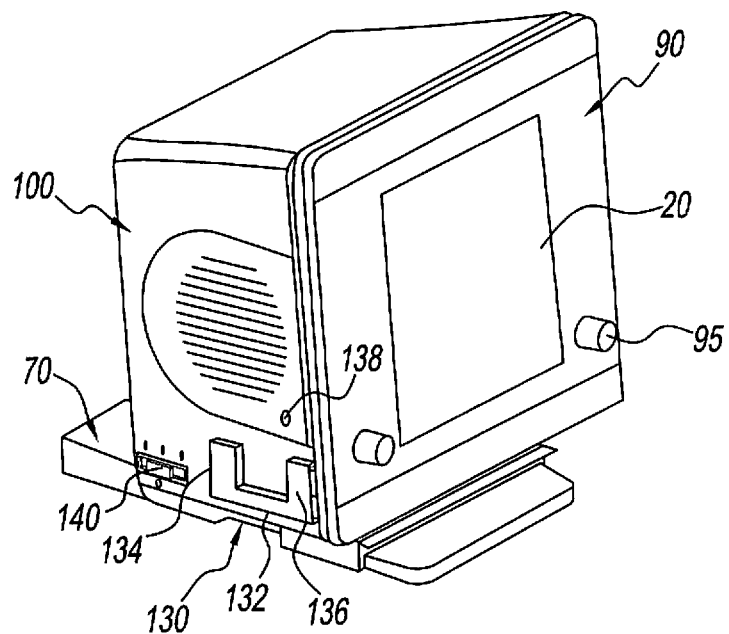
FIG. 9 is a perspective view of an alternate embodiment of the present invention.
Figure 10:
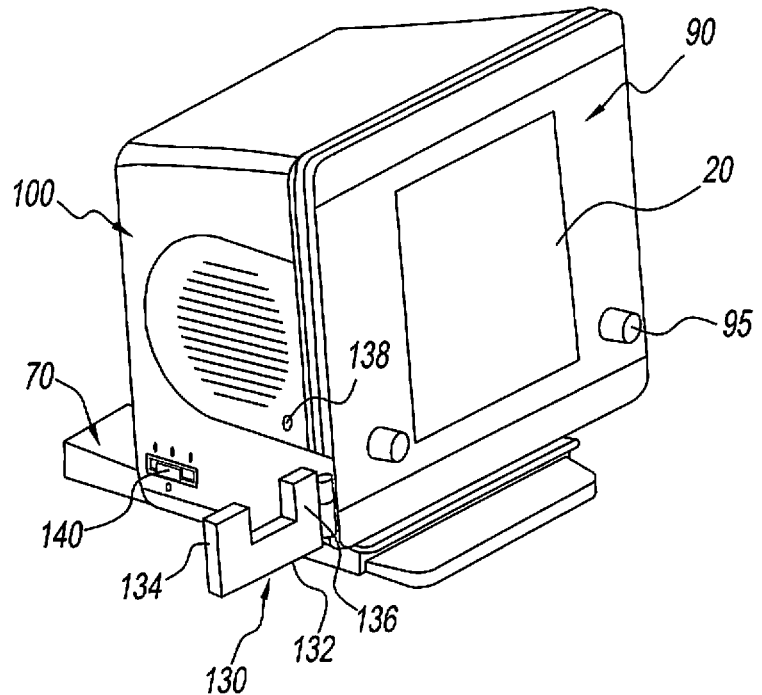
FIG. 10 is a perspective view of FIG. 9 with the dock in an extended position.

In another embodiment of the present invention the speaker 50 is capable of being connected to an external audio player receivable in a dock 130 thereby allowing users to plug in an audio player and use audio files of their choice. As shown in FIGS. 9 and 10, the dock 130 comprises a base 132, a left arm 134 and a right arm 136. The right arm 136 of the dock 130 is connected to the left side panel 2 of the housing 100 by a pivot hinge that allows the dock 130 to move from a first folded position, as shown in FIG. 9, to a second extended position, shown in FIG. 10. The left arm 134 is spring loaded towards right arm 136 such that dock 130 can accommodate audio players of various widths and such that an audio player can be securely placed in the dock 130. In the second extended position the base 132 of the dock 130 is capable of accepting an audio player such as a mp3 player or an Apple iPod® player. In the preferred embodiment on the left side panel 2 of the housing 100 adjacent the speaker cover 55 is an audio input 138 capable of accepting an audio cable that connects the audio player to the speaker 50.

The features of the invention illustrated and described herein are the preferred embodiments. Therefore, it is understood that the appended claims are intended to cover the variations disclosed and unforeseeable embodiments with insubstantial differences that are within the spirit of the claims.

What I claim is:

1. A virtual display system comprising:
   a. a housing comprises a top panel, a bottom panel opposite said top panel, a front panel with an opening defining at least one side border, a first side panel abutting one of said at least one side border of said front panel and said top and bottom panels, and a second side panel opposite said first side panel;
   b. a display object at a corner of said housing immediately adjacent to said top panel, said front panel and said first side panel behind one of said side border such that said display object is not viewable from outside said housing through said opening;
   c. a reflecting means disposed diagonally within said housing facing said display object and said opening;
   d. means for rotating said display object adjacent to said corner, said rotating means extending from said top panel;
   e. means for interchangeably securing said display object to said rotating means adjacent to said corner;
   f. a Fresnel lens covering said opening of said front panel;
   g. a light source disposed within said housing external of said display object for illuminating said display object and not illuminating said rotating means or said securing means, said light source is located between said reflecting means and said front panel below said display object and adjacent said reflecting means and said bottom panel directed upward at said display object;
   wherein said display object being illuminated by said light source projects via said reflecting means and said Fresnel lens a virtual three-dimensional image outside said housing in front of said opening.

2. The system of claim 1 further comprising a power source for said rotating means and said light source.

3. The system of claim 2 further comprising a motion and proximity sensor switch for actuating said power source.

4. The system of claim 1 further comprising: a faceplate having a cut out removably attachable to said front panel wherein said Fresnel lens is viewable though said cut out.

5. The system of claim 4 wherein said faceplate having designs thereon corresponding to said display object.

6. The system of claim 1 further comprising at least one speaker.

7. The system of claim 6 further comprising second means for controlling the volume of said speaker.

8. The system of claim 6 wherein said device further comprising an audio jack for connecting an external audio player to said speaker.

9. The system of claim 6 further comprising an integrated circuit for storing audio sound wherein said speaker is capable of playing said audio sound being stored on said integrated circuit.

10. The system of claim 9 wherein said device further comprising means for recording audio sound onto said integrated circuit.

11. The system of claim 9 further comprising means for docking an external audio player connected to said housing.

12. The system of claim 1, wherein said housing further comprising a bottom panel; and said system further comprising a support base; wherein said bottom panel of said housing pivotably rests against said support base.

13. The system of claim 12, wherein said housing further comprises a back panel opposing said front panel; and said system further comprising an adjustment means slidably sleeved over said support base positioned between said bottom panel and said support base to allow the tilting of said housing.

14. The system of claim 13, wherein said adjustment means comprises a tab extension, said bottom panel of said housing having a central track running from near said front panel to near said back panel; wherein said tab extension slidably engages said central track.

15. The system of claim 1 wherein said light source comprises at least one light emitting diode.

16. The system of claim 1 wherein said light source comprises at least one ultra-violet light emitting diode, and said display object having a black light responsive paint thereon.

17. The system of claim 1 wherein said securing means comprises a rod attached to said display object with its distal end having a magnet, and wherein said rotating means having a magnetizable material attractable to said magnet.

18. The system of claim 1 wherein said securing means comprises a rod attached to said rotating means with its distal end having a magnet, and wherein said display object having a magnetizable material attractable to said magnet.

19. The system of claim 1 wherein said rotating means comprises a motor.

20. The system of claim 1 wherein said reflecting means comprises a mirror.

21. The system of claim 1 wherein said reflecting means comprises a magnifying mirror.

22. The system of claim 1 further comprising first means for controlling the speed of said rotating means.

* * * * *